(12) United States Patent
Caslowitz

(10) Patent No.: US 9,919,656 B2
(45) Date of Patent: *Mar. 20, 2018

(54) REFORMABLE CLOSURE DEVICE STRAP

(71) Applicant: WIRE CORE STRAP, LLC, Carlsbad, CA (US)

(72) Inventor: Bruce J. Caslowitz, Carlsbad, CA (US)

(73) Assignee: WIRE CORE STRAP, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,478

(22) Filed: Mar. 7, 2016

(65) Prior Publication Data

US 2016/0185302 A1 Jun. 30, 2016

Related U.S. Application Data

(60) Continuation of application No. 14/088,189, filed on Nov. 22, 2013, now Pat. No. 9,278,651, which is a division of application No. 13/527,552, filed on Jun. 19, 2012, now Pat. No. 8,720,910, which is a continuation of application No. 13/027,252, filed on Feb. 14, 2011, now Pat. No. 8,201,308, which is a continuation of application No. 11/515,349, filed on Sep. 1, 2006, now Pat. No. 7,887,082.

(51) Int. Cl.
| | |
|---|---|
| *B60R 9/08* | (2006.01) |
| *B60R 9/048* | (2006.01) |
| *A43B 5/16* | (2006.01) |
| *A43C 11/14* | (2006.01) |
| *A63C 10/06* | (2012.01) |
| *A44B 11/00* | (2006.01) |
| *B60R 9/04* | (2006.01) |

(52) U.S. Cl.
CPC ........... *B60R 9/048* (2013.01); *A43B 5/16* (2013.01); *A43C 11/146* (2013.01); *A44B 11/00* (2013.01); *A63C 10/06* (2013.01); *B60R 9/08* (2013.01); *B60R 9/04* (2013.01); *Y10T 24/10* (2015.01); *Y10T 24/21* (2015.01); *Y10T 24/2106* (2015.01); *Y10T 24/2183* (2015.01); *Y10T 24/47* (2015.01)

(58) Field of Classification Search
CPC .. A44B 11/00; B60R 9/00; B60R 9/09; Y10T 24/47; Y10T 24/21; Y10T 428/249943
USPC ......... 224/324, 148.1, 148.2, 148.4; 40/665; 24/30.5 T
See application file for complete search history.

(56) References Cited

U.S. PATENT DOCUMENTS 6,283,310 B1 * 9/2001 Dean ..................... B60R 9/048
211/17

* cited by examiner

*Primary Examiner* — Adam Waggenspack
(74) *Attorney, Agent, or Firm* — Mintz Levin Cohn Ferris Glovsky and Popeo PC

(57) ABSTRACT

Various mechanical closure systems and securing systems are disclosed, such as snowboard bindings and car rack systems. The systems include a mechanically reformable strap. The strap includes a wire disposed along a longitudinal axis of the strap. The wire maintains the strap in a desired geometry that is different from a previous geometry of the strap. In other embodiments, a wire-core strap can include transverse ridges, holes, or other types of grooves or apertures.

8 Claims, 8 Drawing Sheets

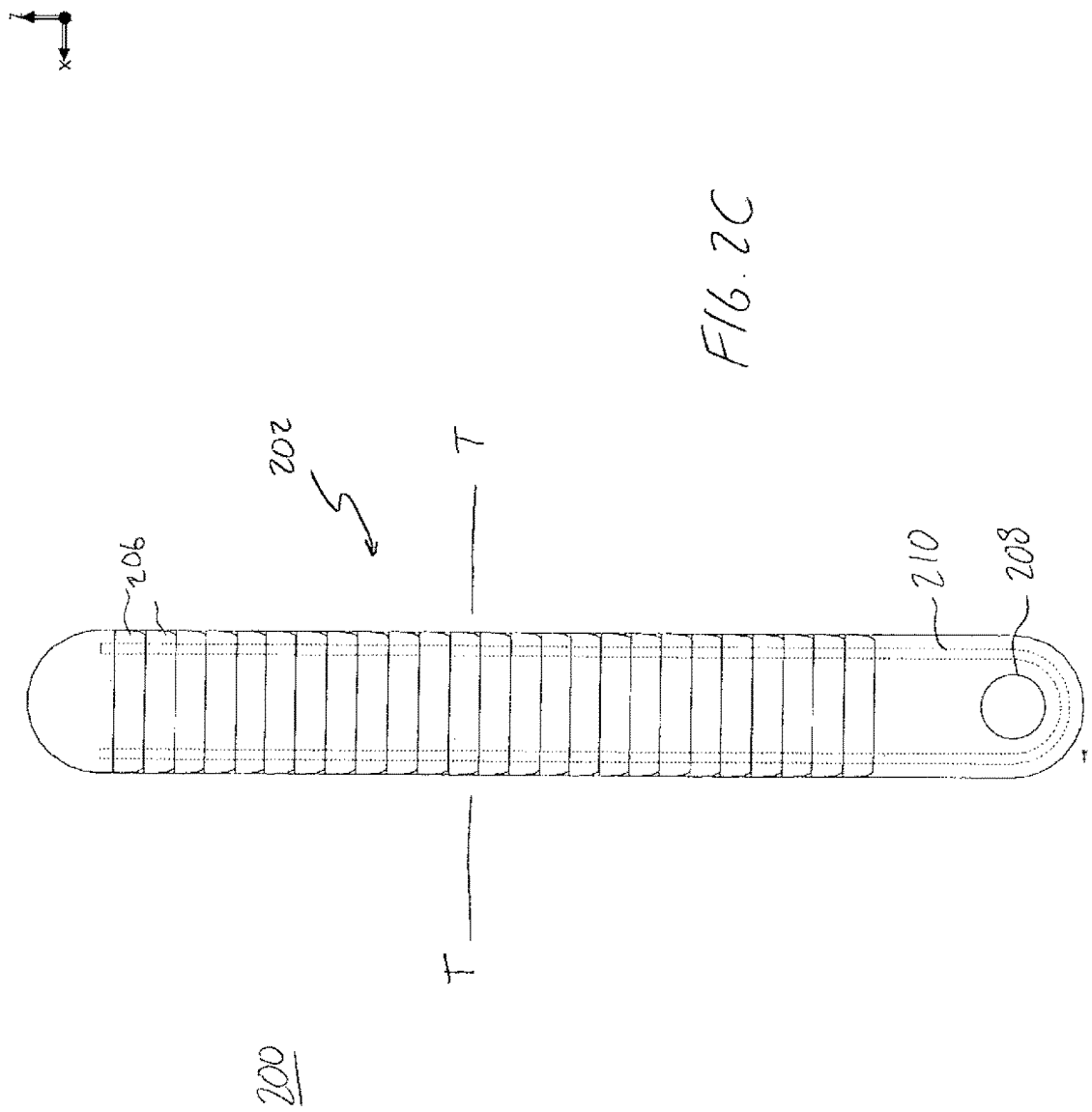

REFORMABLE CLOSURE DEVICE STRAP

CROSS REFERENCE TO RELATED APPLICATIONS

This application is a continuation of and claims the benefit of priority under 35 U.S.C. § 120 of U.S. patent application Ser. No. 14/088,189, filed Nov. 22, 2013, entitled "Reformable Closure Device Strap" which is a Divisional of U.S. patent application Ser. No. 13/527,552, filed Jun. 19, 2012, entitled "Reformable Closure Device Strap", which is a Continuation of U.S. patent application Ser. No. 13/027,252, filed Feb. 14, 2011, now U.S. Pat. No. 8,201,308, entitled "Reformable Closure Device Strap", which is a Continuation of Ser. No. 11/515,349, filed Sep. 1, 2006, now U.S. Pat. No. 7,887,082, entitled "Reformable Closure Device Strap", which the disclosures of which are incorporated herein by reference.

BACKGROUND

Mechanical closure systems. are used extensively in the sports, medical and transportation industries. These closure systems typically use plastic strap such as a ladder strap. A ladder strap is formed with a top side that includes a number of transverse ridges that are sequentially engaged by a latching mechanism. In the sports industry, for example, mechanical closure systems are used in harnessing devices on such items as snowboard bindings, ski boots, wake board bindings and inline skates.

For most applications, conventional straps such as ladder straps are purposely preformed with a curved geometry where the top side is convex and a bottom side is concave, so as to enclose around an object such as a foot or limb, or a part of a device. Alternatively, conventional straps are preformed flat and straight, with no curvature. However, regardless of an original geometry, conventional straps are made to resiliently return to that original geometry.

The preformed geometry of conventional straps can interfere with easy ingress and egress of an object in a mechanical closure system. In fact, conventional straps may become bent unnaturally by the object or caught on a sharp edge of a device onto which the object is held or enclosed. In the sport of snowboarding, for example, a user needs to manually hold open a padded boot enclosure system in order to step into a binding, and very often in inclement environments. The straps, in their original geometry, may be stepped on or held too far beyond a desired or useful geometry, leading to breakages or weakening of the straps.

SUMMARY

This document discloses improved plastic straps for mechanical closure systems, and systems and devices employing the same.

In one aspect, a closure apparatus includes a strap. The strap includes a wire disposed along a longitudinal axis of the strap. The wire maintains the strap in a desired geometry that is different from a previous geometry of the strap. In other aspects, a wire-core strap can include transverse ridges, holes, or other types of grooves or apertures.

According to a specific aspect, a mechanical closure device includes an elongated thermoplastic ladder strap having a top face that includes a number of transverse ridges and an aperture. The mechanical closure device further includes a U-shaped metal wire embedded in the ladder strap that partially circumscribes the aperture and extends in parallel along a major portion of a longitudinal axis of the ladder strap, the U-shaped wire being adapted to maintain the ladder strap in a desired geometry that is different from a previous geometry of the ladder strap.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 2A-2C are various views of a ladder strap.

Like reference symbols in the various drawings indicate like elements.

DETAILED DESCRIPTION

This document describes closure devices. In particular, this document describes a wire-core strap that is bendable from an original or enclosing geometry to a desired or opened geometry, enhancing the safety and ease of use of such closure devices. The embedded wire provides tensile strength and an ability to maintain a form or a bend into a desired geometry, and resists reforming the strap into its previous geometry without external influence. These straps can be embodied as ladder straps, also called ratchet straps, which can be used for mechanical closure systems in sports (bindings for snowboards, snowshoes, in-line roller skates, etc.), medical (orthotics, prosthetics, stabilization boots, spinal stabilizers, etc.), and transportation (car-top carrier systems or roof racks, etc.) applications. Other applications are possible and within the scope of this document.

Figure 1:
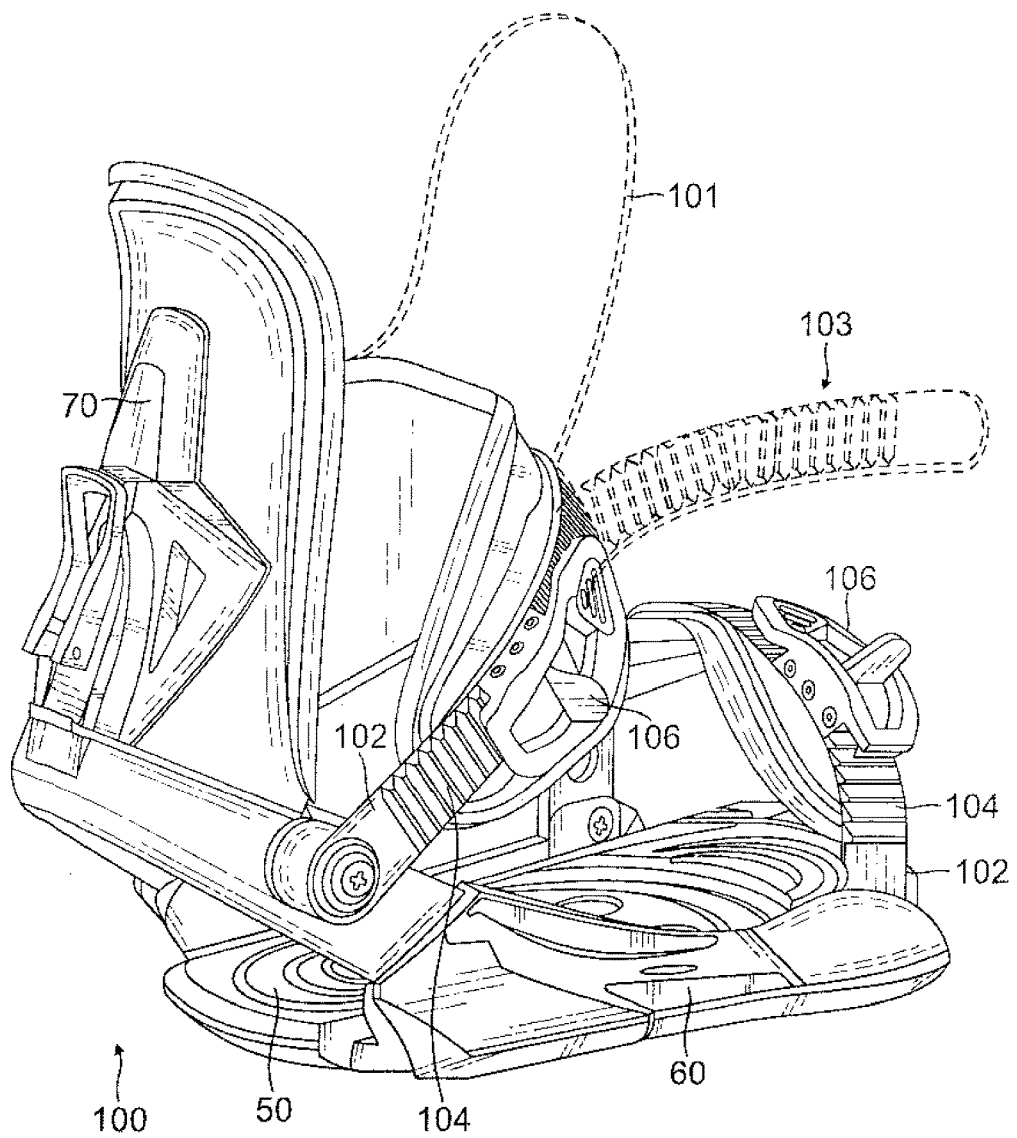
FIG. 1 depicts a snow sport binding mechanism.

FIG. 1 shows a snowboard binding 100 to illustrate one application of a closure device in accordance with embodiments herein. The snowboard binding 100 includes a rigid base 50, a rigid foot and heel support member 60 extending up from opposing sides of the base 50, and a pivotable back ankle support member 70 connected to the rigid foot and heel support member 60.

The snowboard binding 100 further includes one or more padded mechanical closure systems for enclosing a boot or foot of a user. Each mechanical closure system can include one or more ladder straps 102. Each ladder strap 102 includes a top side 104, at least a portion of which can have a number of transverse ridges that can be sequentially engaged by a locking tang of a ratcheting receptor 106. Each ladder strap 102 includes a wire (not shown), either embedded within the strap or disposed thereon, that allow the ladder straps 102 to be maintained in a geometry 103 that is different from a preformed geometry. Thus, the padded part of the mechanical closure system can also be held in an open position 101 as well, for easy ingress and egress of a boot into and out of the snowboard binding 100.

Figure 2A:
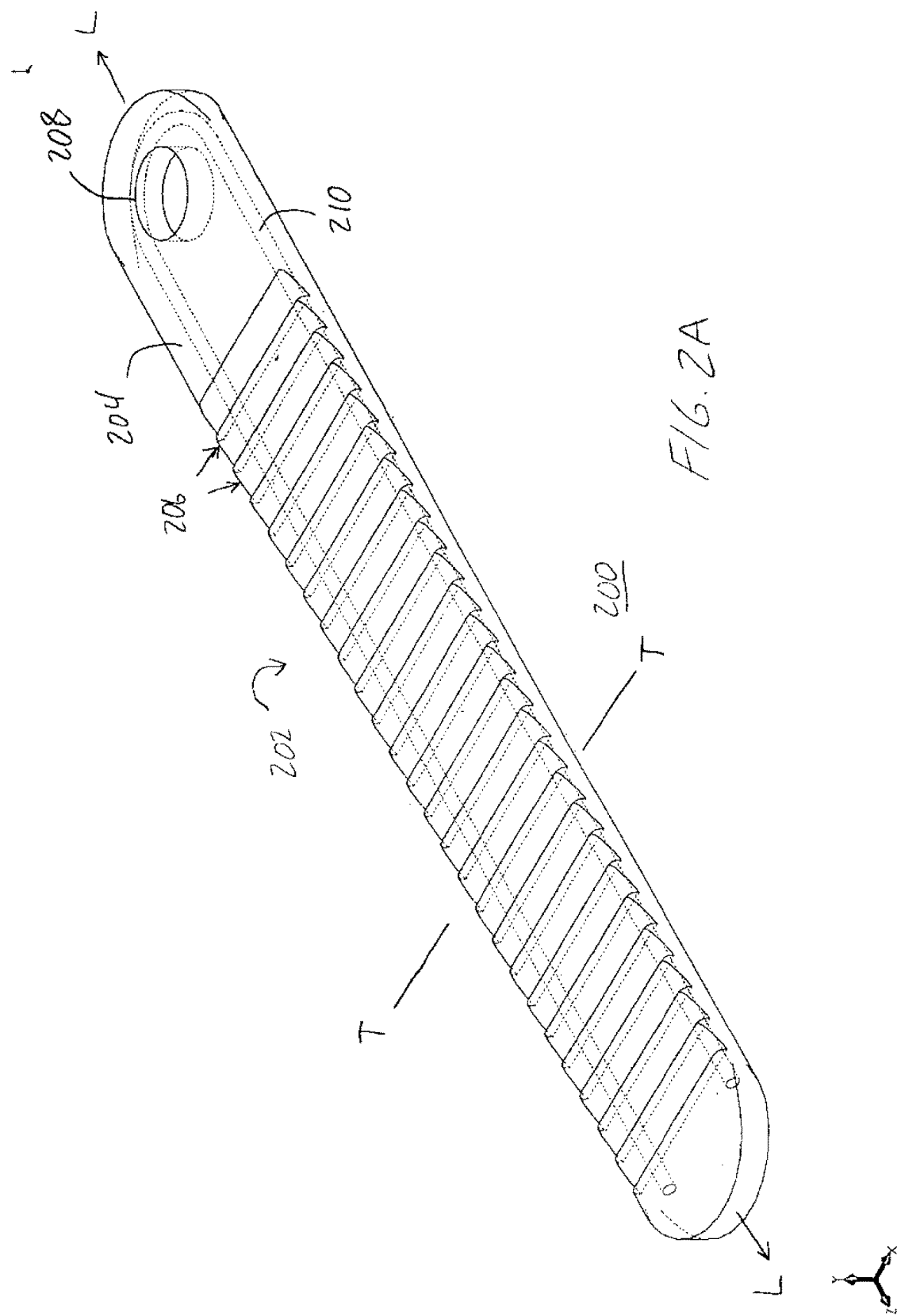
Figure 2B:
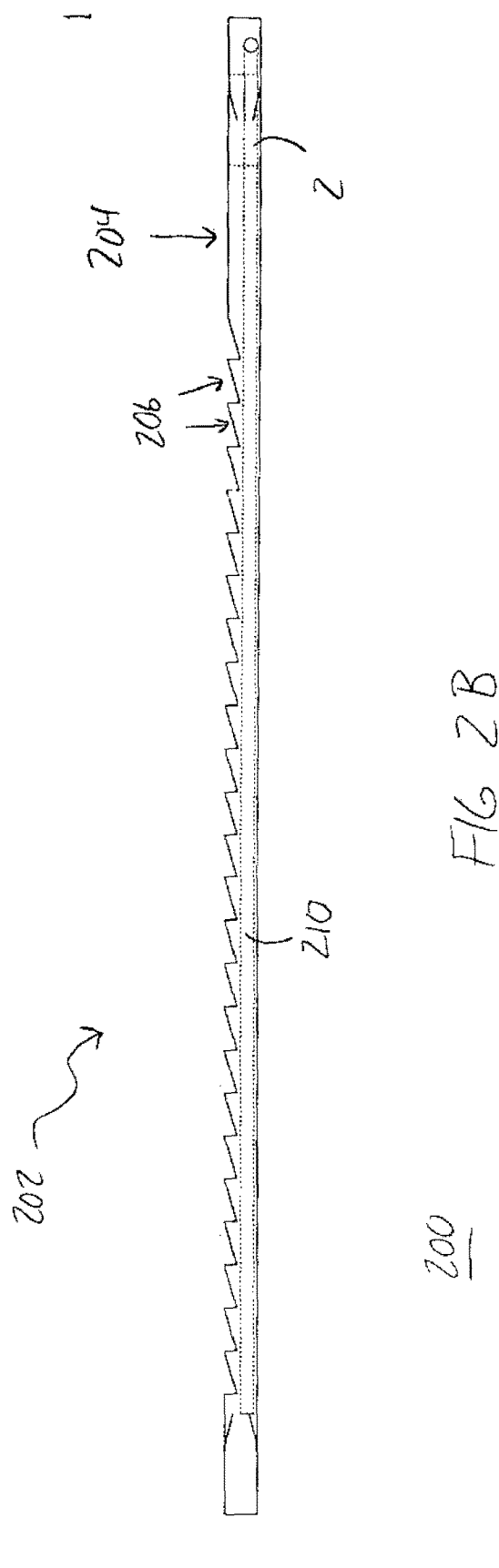

FIG. 2A shows a perspective view of a closure device 200 that is formed according to preferred embodiments described herein. FIG. 2B is a side view along the longitudinal axis L of the closure device 200, and FIG. 2C is a top-down view onto the top face 204 of the closure device 200. The closure device. 200. includes an elongated ladder strap 202 having a top face 204 that includes one or more transverse ridges 206. The transverse ridges 206 are for engaging with a tang of a ratcheting receptor. Alternative embodiments of a closure device 200 include a strap with a smooth top face 204, with any number of holes or grooves for engaging a receptor mechanism, as is described with reference to FIGS. 3A and 3B.

The ladder strap 202 may also include an aperture 208 that is preferably positioned and aligned in the middle of one end of the ladder strap 202. The ladder strap 202 can be any length, width or thickness, but must be formed of a material of such thickness and density so as to be bendable to various geometries. Preferably, the ladder strap 202 is longer in a longitudinal axis (L) than a transverse axis (I) so as to be elongated.

The closure device 200 further includes a wire 210 embedded within the ladder strap 202. In an exemplary embodiment, the wire 210 includes is a U-shaped metal wire having two parallel arms. The U-shaped metal wire can be positioned to at least partially circumscribe the aperture 208 for additional strength near the aperture 208, such that the arms extend in parallel along a major portion of a longitudinal axis L of the ladder strap 202. The wire 210 is adapted to maintain the ladder strap 202 in a desired geometry that is different from a previous geometry. For example, in a snowboard binding as shown in FIG. 1, the closure device 200 can be opened away from the base to allow a user easy and catch-free ingress into and egress from the binding.

Figure 3A:
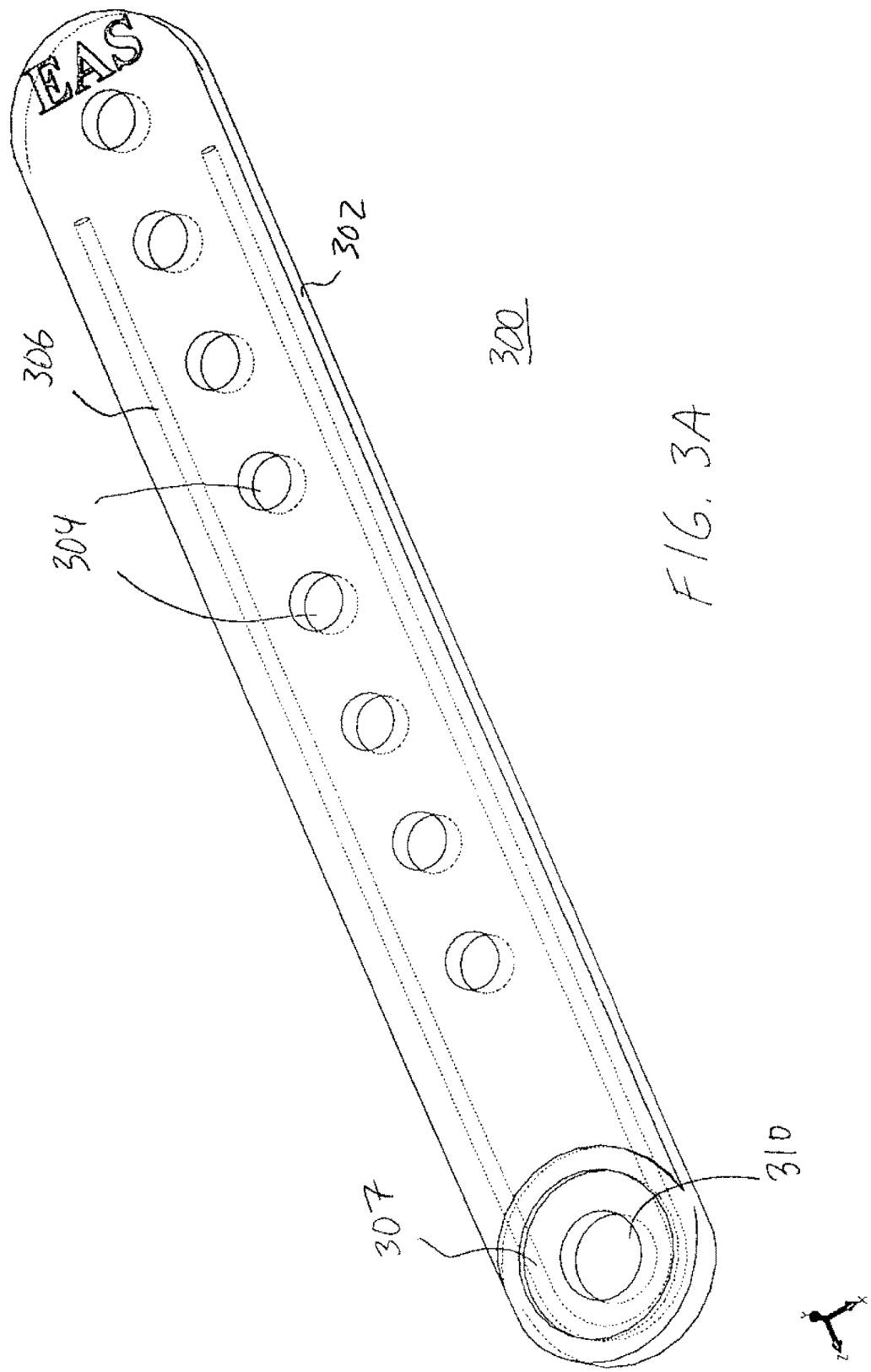
FIGS. 3A and 3B illustrate alternative embodiments of a closure device.
Figure 3B:
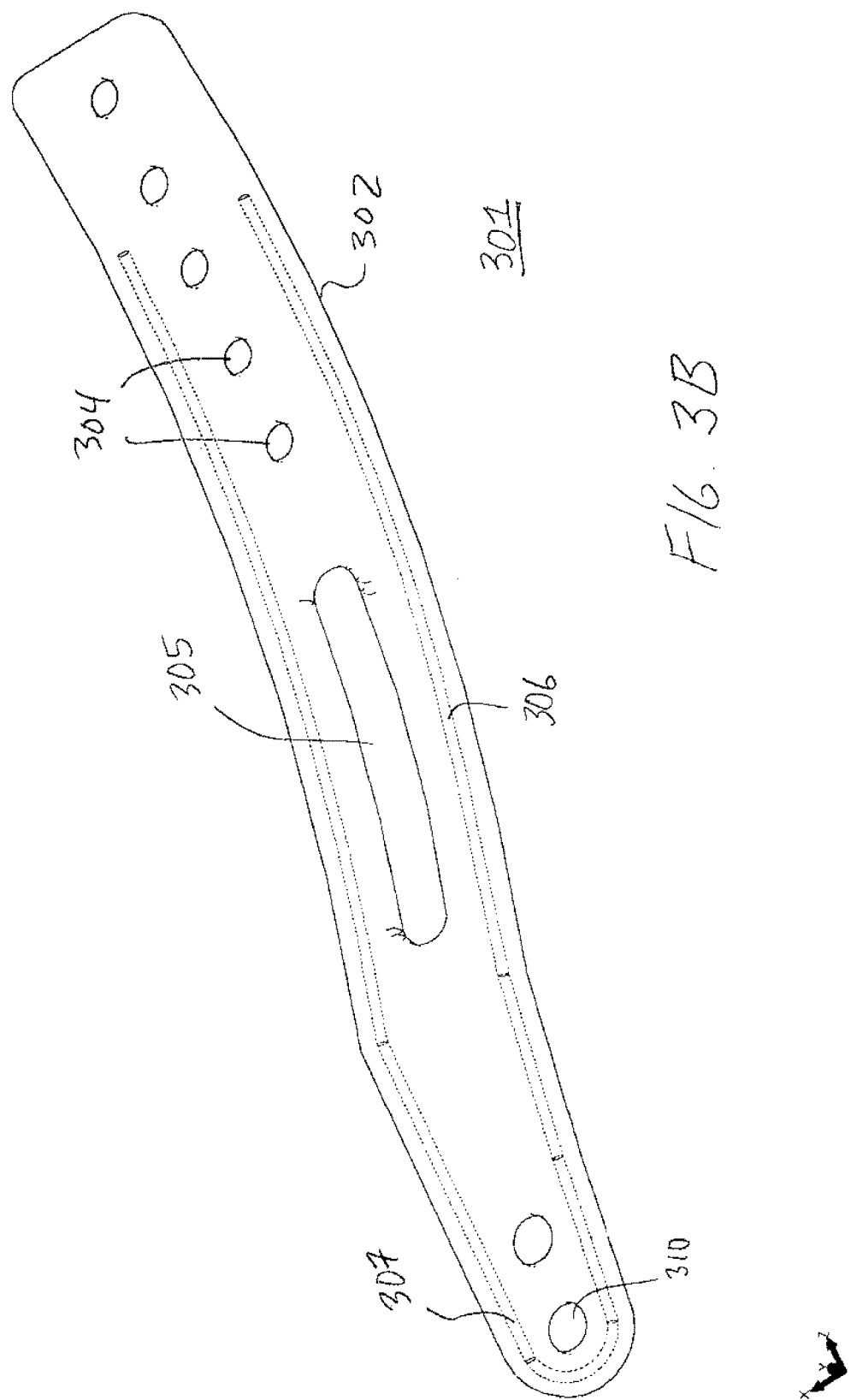

FIGS. 3A and 3B illustrate alternative embodiments of a closure device 300 and 301, respectively. The closure devices 300 and 301 include a strap 302 having one or more holes 304 through the strap 302. The straps 302 are generally flat and elongated, but can be of any length, width or thickness. The holes 304 are preferably centered and uniformly spaced, and generally rounded. However, the holes 304 can be positioned anywhere within the strap 302, and may include an elongated slat 305 as shown in the strap 301 of FIG. 3B, A geometry of the strap 302 is maintained by a wire 306 that is preferably embedded in the strap. The wire 306 can include generally parallel arms connected to a U-shaped portion 307 of the wire. The U-shaped portion 307 can be positioned at a periphery of one end of the strap, and may at least partially circumscribe an aperture 310 provided at that end, so as to provide further strengthening of the end of the strap.

Figure 4:
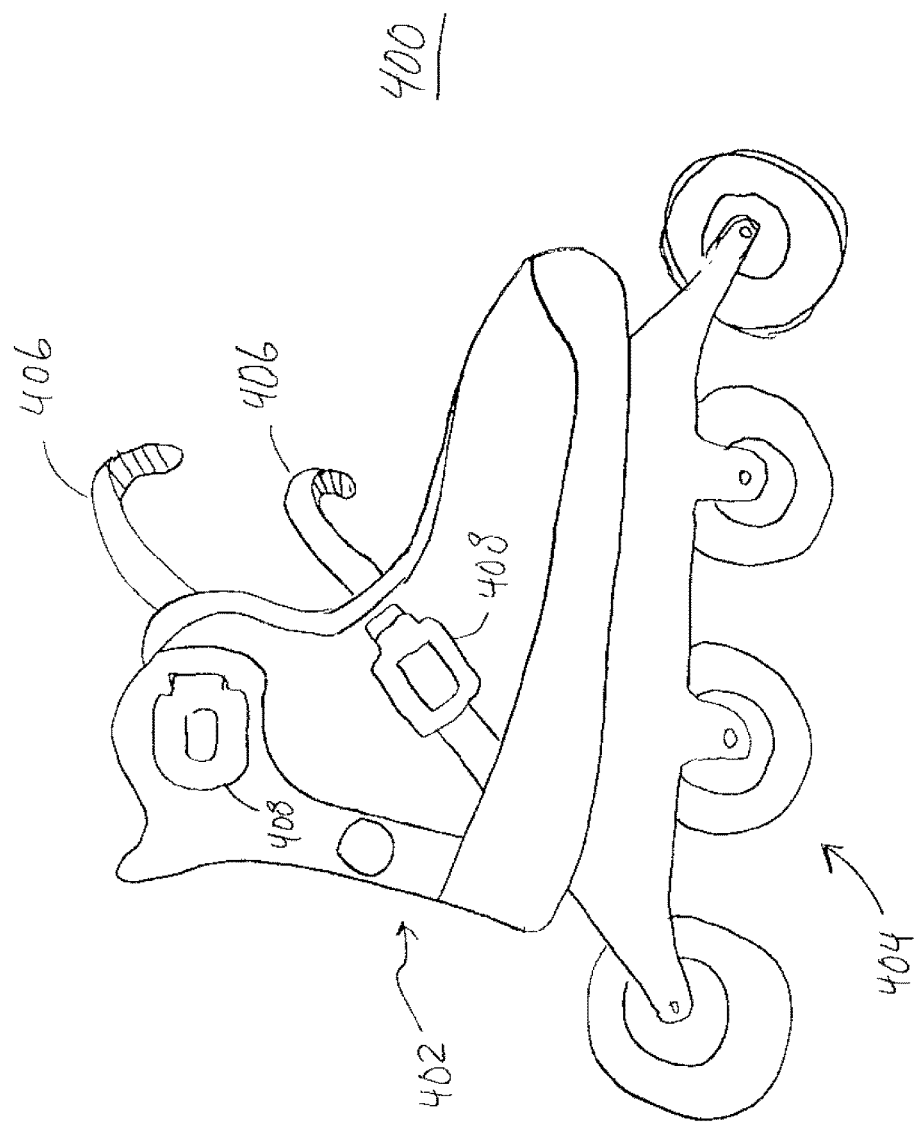
FIG. 4 depicts an inline skate having a closure device.

FIG. 4 shows an inline skate 400 to illustrate yet another application of the closure devices described herein. The inline skate 400 includes a shoe 402 to receive a skater's foot, the shoe being mounted on a number of aligned wheels 404. The shoe can be enclosed around a skater's foot and ankle by engaging a ladder strap 406 into a receptor mechanism 408. When not so engaged, each ladder strap 406. includes a wire disposed along a longitudinal axis so that the strap can be bent outwardly and maintained in an open geometry as shown, so that a skater may insert or remove their foot without catching it on the ladder straps 406.

In preferred embodiments, each strap is formed of thermoplastic or thermoplastic polyurethanes that can withstand shock and adverse weather conditions and wild swings in temperature. In specific preferred embodiments, straps are formed of a thermoplastic polyester elastorner, such as Hytrel®, to provide the flexibility of rubbers, the strength of plastics, and the processibility of thermoplastics. The straps can be made using any thermoplastic processes like injection molding, extrusion and meltcasting.

Figure 5:
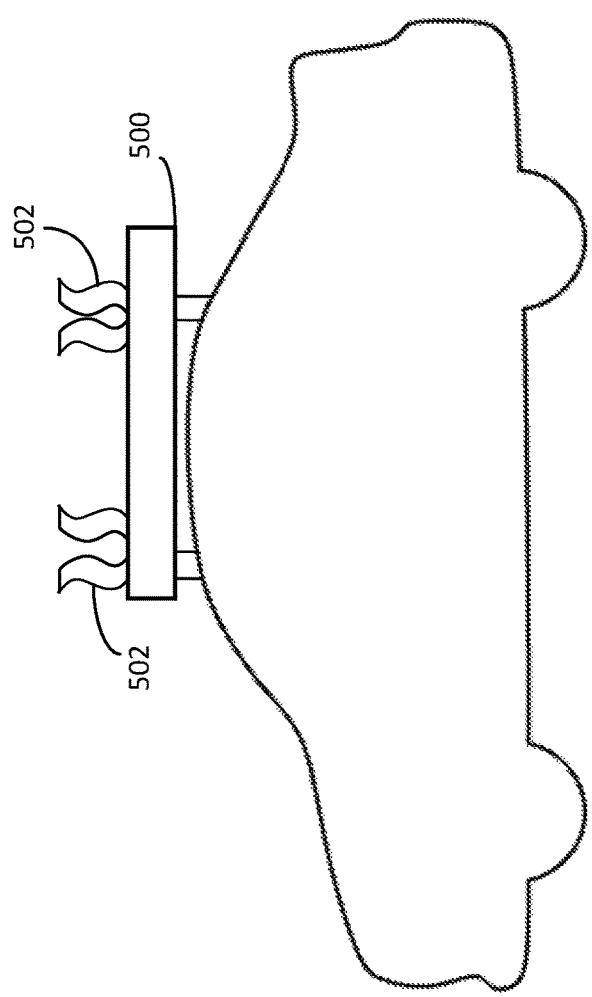
FIG. 5 shows a car carrier apparatus having one or more closure devices coupled therewith.

FIG. 5 illustrates one implementation of a carrier apparatus 500 that attaches to an automobile, for securing an item to the automobile. The carrier apparatus 500 includes one or more closure devices 502 coupled to the carrier apparatus 500 for securing the item received on the carrier apparatus 500.

Although a few embodiments have been described in detail above, other modifications are possible. For example, the wire may be bonded or otherwise attached to a surface of the strap, and need not necessarily be embedded within the core of the strap. Other embodiments may be within the scope of the following claims.

What is claimed:

1. A system for securing an item to an automobile, the system comprising:
    a carrier apparatus that attaches to the automobile, the carrier apparatus for receiving the item to be secured to the automobile; and
    one or more closure devices coupled with the carrier apparatus for securing the item received on the carrier apparatus, at least one of the one or more closure devices comprising:
        a strap having at least one aperture at one end by which the strap is connectable to the carrier apparatus; and
        a wire embedded in the strap, the wire having a U-shaped bend that partially circumscribes the at least one aperture about a first axis and spaced-apart parallel arms that extend in parallel along a major portion of a longitudinal axis of the strap, the spaced-apart parallel arms being reformable about a second axis that is orthogonal to the first axis to temporarily maintain the strap in a desired geometry that is different from a previous geometry of the strap.

2. The system in accordance with claim 1, wherein the carrier apparatus is a roof-top rack for securing the item to a roof-top of the car.

3. A system for securing an item to an automobile, the system comprising:
    a carrier rack that attaches to the automobile, the carrier rack having one or more racks for receiving the item to be secured to the automobile;
    one or more closure devices coupled with the carrier apparatus for securing the item received on the carrier apparatus, at least one of the one or more closure devices comprising a flexible body and a wire embedded in and disposed along a longitudinal axis of the flexible body, the wire for temporarily maintaining the flexible body in a desired geometry that is different from a previous geometry of the flexible body, the wire having a U-shaped bend about a first axis with spaced-apart arms that extend along a major portion of the longitudinal axis of the pliable body, the spaced-apart arms being reformable about a second axis that is orthogonal to the first axis.

4. The system in accordance with claim 3, wherein the flexible body further comprises a substantially flat top face and a plurality of transverse ridges on the top face.

5. The system in accordance with claim 4, wherein the flexible body further comprises an aperture through the top face at a first end of the flexible body, and wherein the U-shaped bend of the wire at least partially circumscribes the aperture.

6. The system in accordance with claim 3, wherein the flexible body is formed of a thermoplastic.

7. The system in accordance with claim 3, wherein the flexible body is elongated such that a length of the flexible body is more than twice a width of the flexible body.

8. A system for securing an item to an automobile, the system comprising:
- a carrier rack that attaches to and extends from the automobile, the carrier rack having one or more racks for receiving the item to be secured to the car;
- a plurality of closure devices coupled with the carrier apparatus for securing the item received on the carrier apparatus, each of the plurality of closure devices comprising a flexible body and a wire embedded in and disposed along a longitudinal axis of the flexible body, the wire for temporarily maintaining the flexible body in a desired geometry that is different from a previous geometry of the flexible body, the wire having a U-shaped bend about a first axis with spaced-apart arms that extend along a major portion of the longitudinal axis of the pliable body, the spaced-apart arms being reformable about a second axis that is orthogonal to the first axis.

\* \* \* \* \*